(12) United States Patent
Yun et al.

(10) Patent No.: US 7,286,640 B2
(45) Date of Patent: Oct. 23, 2007

(54) DUAL-BAND DETECTOR SYSTEM FOR X-RAY IMAGING OF BIOLOGICAL SAMPLES

(75) Inventors: Wenbing Yun, Walnut Creek, CA (US); Yuxin Wang, Arlington Heights, IL (US); David Dean Scott, Oakland, CA (US)

(73) Assignee: Xradia, Inc., Concord, CA (US)

( * ) Notice: Subject to any disclaimer, the term of this patent is extended or adjusted under 35 U.S.C. 154(b) by 0 days.

(21) Appl. No.: 10/990,198

(22) Filed: Nov. 16, 2004

(65) Prior Publication Data

US 2005/0226376 A1    Oct. 13, 2005

Related U.S. Application Data

(60) Provisional application No. 60/560,992, filed on Apr. 9, 2004.

(51) Int. Cl.
  *H05G 1/64* (2006.01)
  *G01T 1/20* (2006.01)

(52) U.S. Cl. ................ 378/98.9; 378/98.3; 250/367; 250/370.09; 250/370.11

(58) Field of Classification Search ........... 378/5, 378/16, 19, 57, 98.3, 98.9, 98.11; 250/367, 250/368, 370.09, 370.11
See application file for complete search history.

(56) References Cited

U.S. PATENT DOCUMENTS

| 3,660,053 | A | * | 5/1972 | Palme | ................ 378/143 |
| 5,150,394 | A | | 9/1992 | Karellas | |
| 5,235,191 | A | * | 8/1993 | Miller | ................ 250/486.1 |
| 5,375,158 | A | | 12/1994 | Logan | |
| 5,481,584 | A | * | 1/1996 | Tang et al. | ................ 378/98.9 |
| 5,497,008 | A | * | 3/1996 | Kumakhov | ................ 250/505.1 |
| 5,570,403 | A | * | 10/1996 | Yamazaki et al. | ................ 378/5 |
| 5,706,327 | A | | 1/1998 | Adamkowski et al. | |
| 5,723,865 | A | * | 3/1998 | Trissel et al. | ................ 250/368 |
| 5,790,629 | A | * | 8/1998 | Svensson et al. | ................ 378/98.7 |
| 5,881,126 | A | | 3/1999 | Momose | |
| 6,018,564 | A | * | 1/2000 | Wilkins | ................ 378/62 |
| 6,038,286 | A | * | 3/2000 | Wagli et al. | ................ 378/98.3 |

(Continued)

OTHER PUBLICATIONS

Koch, Andreas, et al., "X-ray imaging with submicrometer resolution employing transparent luminescent screens," Journal of Optical Society of America, 15(7), Jul. 1998, abstract only.

(Continued)

*Primary Examiner*—Allen C. Ho
(74) *Attorney, Agent, or Firm*—Houston Eliseeva LLP (57) ABSTRACT

A digital dual-band detector functions as an imaging platform capable of extracting hard and soft tissue images, for example. The detector has a first detector system comprising a first scintillator for converting x-rays from a sample to an first optical signal, and a first detector for detecting the first optical signal in combination with a second detector system comprising a second scintillator for converting x-rays from the sample and passing through the first scintillator to a second optical signal, and a second detector for detecting the second optical signal. The detector can facilitate the implementation and deployment of recent developments and can permit low cost practical deployment in clinical applications as well as biomedical research applications where significant improvement in spatial resolution and image contrast is required.

22 Claims, 9 Drawing Sheets

U.S. PATENT DOCUMENTS

| | | | |
|---|---|---|---|
| 6,091,796 | A | 7/2000 | Trissel et al. |
| 6,163,590 | A | 12/2000 | Wilkins |
| 6,226,353 | B1 | 5/2001 | Wilkins et al. |
| 6,285,740 | B1 * | 9/2001 | Seely et al. ............... 378/98.9 |
| 6,353,657 | B1 * | 3/2002 | Bayrock et al. ........... 378/98.3 |
| 6,356,617 | B1 * | 3/2002 | Besch et al. ............. 378/98.11 |
| 6,470,068 | B2 * | 10/2002 | Cheng ......................... 378/20 |
| 6,584,170 | B2 * | 6/2003 | Aust et al. .................... 378/57 |
| 6,934,409 | B2 | 8/2005 | Ohara |
| 6,973,161 | B2 * | 12/2005 | Ohtsuki ....................... 378/57 |
| 7,010,092 | B2 * | 3/2006 | Winsor ..................... 378/98.9 |
| 7,019,304 | B2 * | 3/2006 | Albagli et al. ......... 250/370.11 |
| 7,027,556 | B2 | 4/2006 | Ohara |
| 7,103,140 | B2 | 9/2006 | Amitani et al. |
| 7,171,031 | B2 | 1/2007 | Sakaida |
| 2005/0017184 | A1 * | 1/2005 | Groh et al. ................. 250/367 |

OTHER PUBLICATIONS

Allman, B. E., et al., "Phase Radiography with Neutrons." Nature 408: 158-159, (2000).

Barty, A., et al., "Quantitative Phase Tomography." Optics Communications 175: 329-336 (2000).

Chapman, D., et al., "Diffraction Enhanced X-ray Imaging," Phys. Med. Biol. 42, 2015 (1997).

Davis, T. J., et al., "Phase-contrast Imaging of Weakly Absorbing Materials Using Hard X-rays," Nature, 373, 595 (1995).

Nugent, K. A., et al., "Quantitative Phase Imaging Using Hard X-Rays," Physical Review Letters 77(14): 2961-2964 (1996).

Pisano, E.D., et al., "Human Breast Cancer Specimens: Diffraction-enhanced Imaging with Histologic Correlation—Improved Conspicuity of Lesion Detail Compared with Digital Radiography," Radiology 214, 895 (2000).

Snigirev, A., et al., "On the Possibilities of X-ray Phase Contrast Imaging by Coherent High Energy Synchrotron Radiation," Rev. Sci. Instrum. 66, 5486 (1995).

Wang, Y., "A High Throughput X-ray Microtomography System at the Advanced Photon Source," Review of Scientific Instruments 72(4): 2062-2068 (2001).

Wilkins, S. W., et al., "Phase-contrast Imaging Using Polychromatic Hard X-rays," Nature 384, 335 (1996).

* cited by examiner

DUAL-BAND DETECTOR SYSTEM FOR X-RAY IMAGING OF BIOLOGICAL SAMPLES

BACKGROUND OF THE INVENTION

X-ray imaging (radiography) is one of the most important and widely used medical diagnostic methods. It can be traced back to the invention of x-rays more than 100 years ago. Well-known applications include mammography, angiography, x-ray computerized tomography (CT) scans, and dental x-rays. For example, x-ray mammography is currently the primary method for breast cancer screening. Recent randomized clinical trials have shown that screening mammography has reduced mortality from breast cancer by 25 to 30 percent in women between the ages of 50 and 70 and by 18 percent among women between the ages of 40 and 50.

In addition to these essential medical applications, x-ray imaging is finding increasingly important applications in biomedical research laboratories, such as in the study of disease progression or effect of genetic engineering or drug therapy. Often, time-lapsed noninvasive, in vivo images of animal models are used. Often mouse models are used to study human disease. By coupling with genomics and molecular and cell biology, the study of the animal models using x-ray imaging will enable noninvasive investigations of biological processes in vivo and longitudinal studies in the same animal. Such studies can significantly contribute to the early detection, diagnosis, and treatment of disease, and to the understanding of disease progression and response to therapy that may contribute to the development of human medicine.

Continued performance improvements in x-ray imaging technology are essential for meeting the evolving needs in medical care and biomedical research. Important progress has been made in recent years in the following three areas: (1) use of source spectral properties that allow for the effective separation of images of soft tissue and hard or mineralized tissue; (2) increased acceptance and wide deployment of digital detectors that increase detection sensitivity and image dynamic range for imaging smaller features; and (3) use of phase contrast, instead of the absorption contrast that is predominately used in current x-ray imaging tools.

Phase contrast has been shown to provide substantial contrast enhancement for many applications and thus will result in a substantial reduction in the radiation dose to the subject. It is well established in recent years that contrast enhancement by more than several orders of magnitude can be achieved in imaging biological objects using phase contrast instead of the absorption contrast.

The phase contrast originates from phase shifting effect of x-rays between different features. The magnitude of the phase contrast is approximately proportional to mass density difference of the features. It has been well recognized that there is a need to develop a clinical-worthy x-ray imaging tool that employs phase contrast to achieve performance gains in terms of increasing detection sensitivity and spatial resolution and reduction of radiation dose to a patient.

Until now, typical phase-contrast imaging with a projection-type microscope requires two exposures with the detector placed at different distances from the sample. Motion-induced differences in the subject during the two exposures often cause artifacts in the reconstructed phase image and limit the image resolution to many tens of micrometers.

Significant progress has also been made in recent years in dual energy x-ray imaging systems. The dual energy x-ray imaging system produces extraordinary images of soft tissue as well as hard tissue, such as bones. Progress, however, is still needed to realize the full potential of this x-ray imaging for biomedical applications. For example, existing dual energy x-ray imaging tools require taking images at two substantially different x-ray spectra within a very short time (~200 milliseconds) to reduce image blurring due to the movement of the object. The imaging tool uses a very specialized x-ray source for fast switching of the x-ray spectra and an expensive detector for extremely fast image readout because each single image contains large amounts of data.

SUMMARY OF THE INVENTION

Dual energy x-ray imaging systems are currently available. They allow for the separation of bone and soft tissues for easier clinical evaluation. These systems accomplish this by acquiring two images; one at a high x-ray energy and one af a low x-ray energy. The x-ray source is typically switched between high energy (100-150 keV) and low energy (60-80 keV) mode while the detector acquires an image at each energy range. These two images are processed using a dual-energy algorithm to extract the soft tissue image and the hard tissue (bone) image.

The present invention concerns a multi-band or dual-band digital detector that can provide an imaging platform capable of extracting hard and soft tissue images. It can further facilitate the implementation and deployment of recent developments and can permit low cost and practical deployment in clinical applications as well as biomedical research applications where significant improvement in spatial resolution and image contrast is required. These improvements include an increase of feature detection sensitivity by more than an order of magnitude, simultaneous imaging of soft and hard (or mineralized) tissue at extremely high time resolutions that is not limited by detector readout speed, and an increase in the signal to noise ratio of images by reducing the substantial background resulting from Compton scattering.

In general according to one aspect, the invention features an x-ray detector. This comprises a first detector system having a first scintillator for converting x-rays from a sample into a first optical signal and a first optical detector for detecting the first optical signal. The detector also has a second detector system comprising a second scintillator for converting x-rays from the sample into a second optical signal. The x-rays received by the second detector have passed through the first scintillator. This second optical signal is detected by a second optical detector.

In one embodiment, an x-ray source generates X-rays in a low energy band and a high energy band. This can be a synchrotron or an electron bombardment x-ray source.

In another embodiment, for phase contrast imaging, the detector receives substantially monochromatic X-rays. Here, the first scintillator of the first detector system is preferably configured for approximately 50% absorption of the x-rays. A monochromator can be used for generating the monochromatic X-rays.

In the preferred embodiment, the first detector system comprises: a mirror for directing the first optical signal out of a path of the X-rays and to the first optical detector and a first optical imaging system for imaging the first optical signal onto the first optical detector. The second detector system comprises a mirror for directing the second optical signal out of a path of the X-rays and to the second optical detector and a second optical imaging system for imaging the second optical signal onto the second optical detector.

In general according to another aspect, the invention features an x-ray imaging system. This system comprises an x-ray source for generating x-rays for irradiating a sample, a first detector system comprising a first scintillator for converting x-rays from the sample into a first optical signal and a first optical detector for detecting the first optical signal, and a second detector system comprising a second scintillator for converting x-rays from the sample and from the first detector system into a second optical signal, and a second optical detector for detecting the second optical signal.

In general according to still another aspect, the invention features an x-ray imaging method. This method comprises generating x-rays for irradiating a sample. These x-rays are converted into a first optical signal which is detected. The x-rays are also converted into second optical signal and detected.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
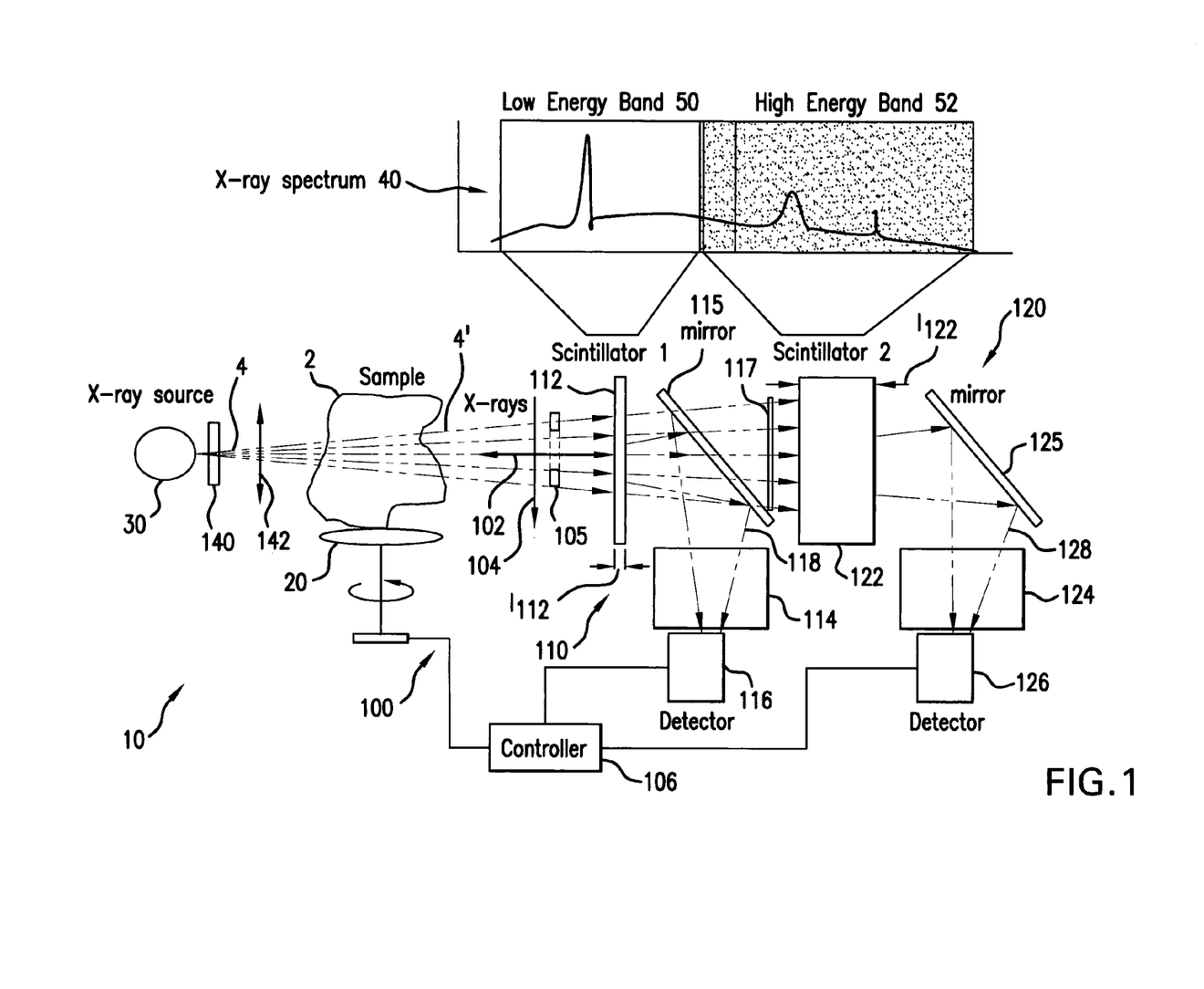
FIG. 1 is a schematic side view of a projection imaging system with a dual-band x-ray detector, according to the present invention.

FIG. 1 shows an x-ray imaging system 10 with an x-ray detector 100 that has been constructed according to the principles of the present invention.

In general, the detector 100 comprises at least two digital detector systems 110, 120. In the illustrated configuration, the first and second detector systems 110, 120 are arranged in tandem along an optical axis or x-ray path 102.

The detector systems 110, 120 are configured with the goal of separating the low energy x-rays 50 from the high energy x-rays 52 in the total x-ray spectrum 40 that is generated by the x-ray source 30.

In more detail, an x-ray beam 4 from preferably a small spot size x-ray source 30 illuminates a sample 2.

In one example, a synchrotron source is used. In other examples, however, an electron bombardment laboratory X-ray source is used. These systems comprise an electron gun that generates an electron beam that is directed at a target. Typically, the target is selected from the group of: chromium, tungsten, platinum, or gold.

The features in the sample 2 will modify the x-ray beam intensity distribution because of either photoelectric absorption or phase shifting; the effects of which are dependant on the spectra of the x-ray source and the thickness and material properties of the features inside the sample, such as elemental composition and mass density.

In general, the attenuation of x-rays away from resonance absorption edges is proportional to $4^{th}$ power of atomic number and is inversely proportional to $3^{rd}$ power of x-ray energy. The magnitude of the phase contrast is approximately proportional to the mass density difference of the features.

The transmitted x-ray beam 4' contains both spatial as well as spectral information. Typically, only the spatial information is recorded. The spectral information contains substantial information about the sample but it is frequently lost. Capturing this information, however, is possible with the dual-band detector 100.

Acquiring two images at different energy bands is accomplished by using two scintillators 112, 122, usually of different thicknesses $1_{112}$ and $1_{122}$, to capture the transmitted x-ray information. The material and thickness $1_{112}$ of a first scintillator 112 is designed to absorb substantially the softer portion, low energy band 50, of the source spectra 40, while the material and thickness $1_{122}$ of a second scintillator 122 is designed to effectively absorb the harder portion, high energy band 52, of the source spectra 40.

The first scintillator 112 is designed so that it captures all or predominantly the lower energy x-ray band 50 and allows most of the higher energy x-rays of the high energy band 52 to pass through to the second scintillator 122.

A first visible light optical signal 118 is generated from this first scintillator 112 and is preferably reflected by a first turning or fold mirror 115. A first optical imaging system 114 is used to image the first visible light optical signal onto a first optical detector 116.

The second scintillator 122 is designed to capture the remaining x-rays that have passed through the first scintillator 112, which are primarily higher energy x-rays.

A second visible light optical signal 128 that is generated from this second scintillator 122 is imaged onto optical detector 126 by a second optical imaging system 124.

The result of this configuration is that images from the sample at two different energy bands can be acquired simultaneously with a single exposure. The controller 106 is then used to construct a representation of the sample using this information.

In some embodiments, the first and second mirrors 115, 125 are not used. This configuration, however, will expose the detectors to possibly damaging radiation and thus is currently not preferred.

Also, the optical imaging systems 114, 124 are also not necessary for all applications. Specifically, the detector 100 is operated in a lower resolution projection mode in some cases.

In contrast, for very high resolution modes, one or more x-ray optical elements are used. In one example, in one high resolution configuration, a zone plate objective 104 is used to provide magnification in the x-ray stage. Also, depending on the source 30, a condenser 142, such as a capillary optic or zone plate, is also added between the source 30 and the sample 2 to collect and focus the x-ray radiation 4 onto the sample 2.

A phase plate optical element 105 is further added in some implementations to enable phase contrast imaging.

In practice, a number of factors must be considered to achieve high quantum detection efficiency in the present detector 100. Those factors include the light yield of the scintillator materials of scintillators 112 and 122, and the numerical aperture and the depth of focus of the first and second optical systems 114, 124.

The digital dual-band detector 100 has advantages in terms of imaging speed, spatial resolution, and signal to noise ratio. With a highly intense x-ray source 30 such a synchrotron, dual energy x-ray imaging with an exposure time of less than 1 millisecond is possible. This speed permits the high speed imaging of the movement of soft tissues in animals or insects, in vivo, in the presence of relatively hard or denser features such as bone or exoskeleton.

The use of the two scintillators 112, 122, and two associated optical imaging systems 114, 124 also allows for imaging with both high spatial resolution and high quantum detection efficiency at the same time by overcoming design constraints associated with simultaneously targeting high resolution and a highly efficient x-ray detector. The efficiency requirement is driven by the need to absorb as many x-rays as possible with a sufficiently thick scintillator while, in contrast, high resolution requires that the scintillator be as thin as possible.

Another advantage of the dual-band imaging design is the potential for reduction in the background due to Compton scattering. The use of two rigidly mounted optical detectors 116, 126 allows for the removal from the image of the background x-rays scattered out of the trajectory from the source to detector by the Compton Effect, allowing improved signal to noise in the x-ray image. This image correction is performed by the controller 106.

The digital dual-band detector 100 is also compatible with x-ray phase contrast imaging, which, especially for biological systems, offers substantially higher contrast than the absorption contrast that is commonly used in current, commercial x-ray imaging systems. Further, the detector 100 provides the required geometry for performing quantitative phase imaging and phase tomography.

The configuration of the dual-energy imaging microscope 10 further allows for easy implementation of three dimensional (3D) tomographic data collection by the controller 106. By placing the sample 2 on a controller-operated rotation stage 20, the required projection images for 3D tomography can be acquired. Along with the appropriate reconstruction algorithms, separate 3D tomographic datasets are preferably reconstructed of the hard tissue and soft tissue structures by controller 106. This dual-energy tomography system also provides a solution to the beam hardening problem often encountered in x-ray tomographic imaging of combination hard/soft tissue structures.

Alvarez and Macovski have proposed an approach that is based on modeling the energy dependence of the linear attenuation coefficient by:

$$\mu(x,y,E)=a_1(x,y)g(E)+a_2(x,y)f_{KN(E)}$$

$$I_1(A_1,A_2)=\int S_1(E)e^{[-A_1g(E)-A_2f_{KN}(E)]}dE$$

$$I_2(A_1,A_2)=\int S_2(E)e^{[-A_1g(E)-A_2f_{KN}(E)]}dE$$

Where I1 and I2 represent the measured intensities at each detector for different source spectra S1 and S2. A1 is the ray integral through the object contributed by the photoelectric absorption and A2 is the ray integrals through the object representing the Compton scattering component. The term g(E) is the material independent contribution of the photoelectric absorption and $f_{KN}$ is the Klein-Nishina function and describes the material independent contribution of the Compton scattering component.

By acquiring the two images I1 and I2 at different energies, the controller 106 solves for A1 and A2 and thereby reconstructs an attenuation coefficient tomogram free from beam hardening artifacts.

Phase Contrast Imaging Using the Dual-band Detector

It is well established both experimentally and theoretically in recent years that contrast enhancement by more than several orders of magnitude can be achieved in imaging biological objects using phase contrast instead of the absorption contrast, which is employed in current commercial x-ray imaging systems. The algorithms for retrieving the true phase information from two or more images acquired at different positions have been developed by a few groups. Until now, two images of a phase object were acquired at different distances from the sample in a typical phase contrast imaging experiment. The phase map of the sample is then computed from these two images. This phase map is the linear sum of the phase shifts through the sample, very much like the linear sum of the attenuation coefficient used in parallel projection tomography with absorption contrast. The two dimensional phase maps can then be used further to reconstruct the three dimensional phase map of the object.

A standard algorithm for phase retrieval is based on the use the transport of intensity equation (TIE), first developed Nugent, K., A., Gureyev, T. E., Cookson, D. F., Paganin, D., Barnea, Z., *Quantitative Phase Imaging Using Hard X-Rays*. Physical Review Letters, 1996. 77(14): p. 2961-2964. This method is based on the knowledge that the intensity and the phase of a propagating wave are coupled in a unique manner, and knowledge of one can be used to determine the other.

For a time-invariant and coherent wave the intensity distribution of the wave I and the gradient of its phase φ are related by:

$$\nabla \cdot [I(\vec{r})\nabla \phi(\vec{r})]=0,$$

For paraxial beam conditions, this equation leads to the transport of intensity equation $$\frac{\partial I(\vec{r})}{\partial z} = \nabla_\perp \cdot [I(\vec{r})\nabla_\perp \phi(\vec{r})],$$

where z is the beam axis and $\nabla_\perp$ is the two dimensional gradient operator in the plane perpendicular to the beam axis.

Using the detector 100, two images at different z positions are acquired and processed by the controller 106, which obtains the two images with value of I. These two images are used to compute the value of $\phi$, which represents the values of integrated relative phase shift through the sample, using computer controller 106. Using an example of a swimming pool, it is similar, in principle, to reconstructing the surface wave pattern by measuring the intensity pattern at two depths.

With reference to FIG. 1, for this application, a monochromator is added to the x-ray beam path, between the source 30 and the detector 100. In one example, the monochromator is added between the source 30 and the sample 2. In other examples, the monochromator 140 is added between the sample 2 and the detector 100. This second configuration is generally preferred for when x-ray optical elements are used. Specifically, the monochromator is added between the zone plate objective 104 and the detector 100. This arrangement is preferred since these monochromators tend to have small angles of acceptance. Because of the microscope geometry, the distance between the sample 2 and objective 104 is small compared with the distance between the objective 104 and detector 100. The angular divergence of the beam is, therefore, lower between the objective and the detector.

By using a quasi-monochromatic illumination x-ray beam and designing the first scintillator to have about 50% transmittance, the present dual-band detector 100 can be used to collect two images required for phase contrast imaging. In addition, the current detector permits very fast data collection for phase contrast imaging, offering significant advantages over the current data collection methods.

Figure 2:
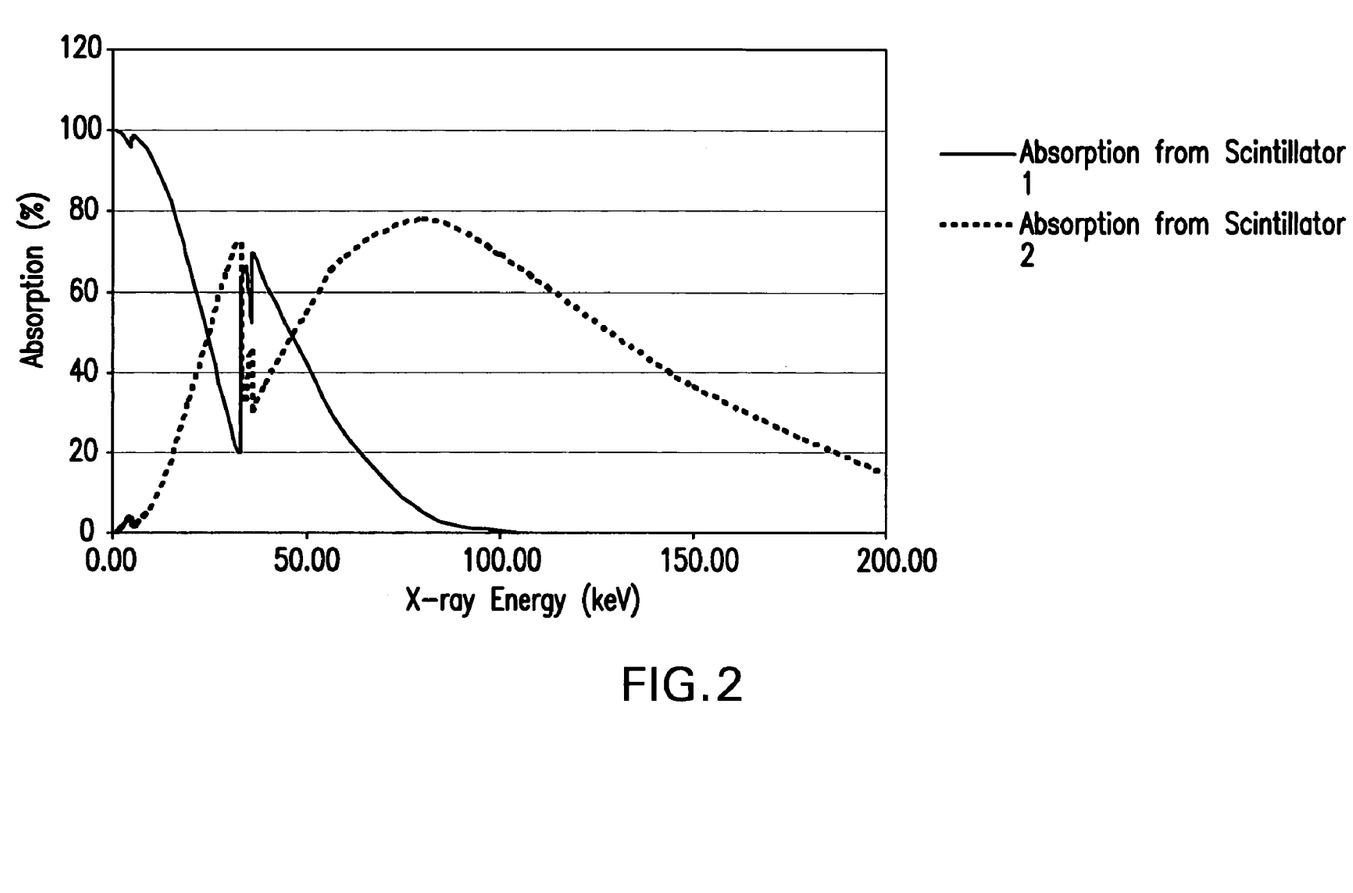
FIG. 2 is a plot of percent absorption as a function of X-ray energy in kilo-electron Volts (keV) for each scintillator, the solid line representing the x-ray absorption within the first scintillator with a thickness of 200 micrometers (μm) and the dashed line representing the absorption within a second scintillator of 3000 μm after passing through the first scintillator.

FIG. 2 illustrates the absorption of x-ray energy through each scintillator in one example. The solid line represents the x-ray absorption within the first scintillator 112 with a thickness of 200 µm. The dashed line represents the absorption within a second scintillator 122 of 3000 µm after passing through the first scintillator 112. Using this approach, a lower energy band up to about 50 keV is separated from a higher energy band from 50 keV to 50 keV Also, in some embodiments, an energy-selective or spectral filter 117, such as filter constructed of silicon, is placed after the first scintillator 112 to further separate the absorption spectra by further attenuating the lower energy band portion of the beam 4'.

In some designs, the total system resolution is 20 µm or better, without resorting to the use of x-ray optical elements.

Generally, the resolution of the entire imaging system is determined by two factors: 1) the detector resolution, which is a function of the numerical aperture (NA) of the objective and the thickness of the scintillator, and 2) the geometric blurring.

$$r_{total} = \sqrt{r_d^2 + r_g^2}$$

where $r_d$ is the resolution of the detector and $r_g$ is the blurring due to the magnification of the projected shadow.

The detector systems 110, 120 are made up of a scintillating material optically coupled to the charge-coupled device (CCD) detectors 116, 126 through respective objective lens systems 114, 124. The scintillators cause some blurring of the image due to the defect of focus. Koch, see Koch Andreas, C. R., Per Spanne, Anatoly Snigirev, *X-ray imaging with submicrometer resolution employing transparent luminescent screens*. Journal of Optical Society of America. 15(7), has studied the combined effects of the scintillator and objective lens and have shown that the modulation transfer function of such a system is given by:

$$MTF(f) = |OTF(f)|$$
$$= \left| \int_{-z_0}^{z-z_0} OTF(f, \delta z) e^{[-\mu(\delta z + z_0)]} d\delta z \right|$$

where f denotes the spatial frequency, z is the scintillator thickness, z0 is the focal plane of the objective and $\delta z$ is the defect of focus. The exponential term is the x-ray absorption with $\mu$ being the absorption coefficient.

Figure 3:
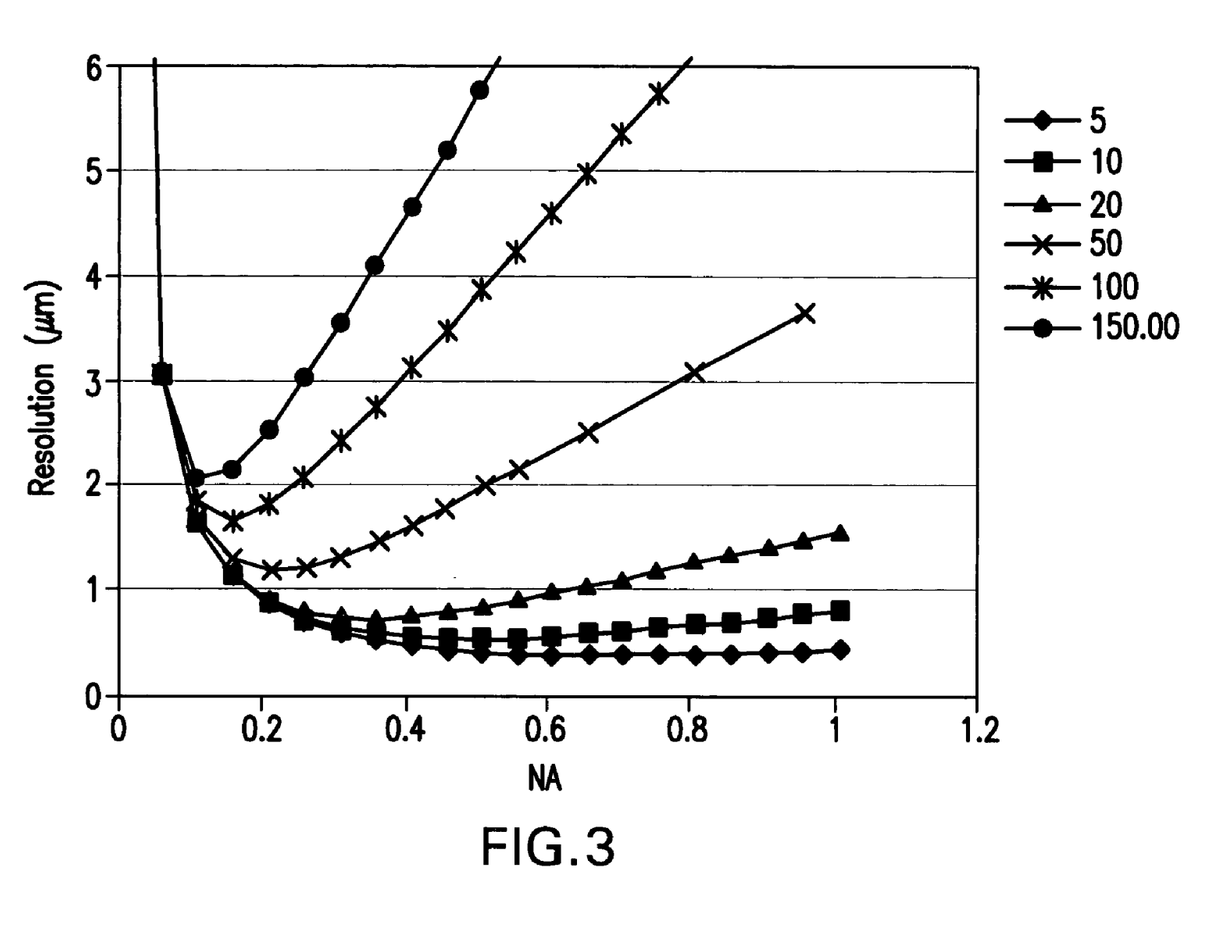
FIG. 3 is a plot of resolution in micrometers as a function of Numerical Aperture (NA) for several values of the scintillator thickness.
Figure 4A:
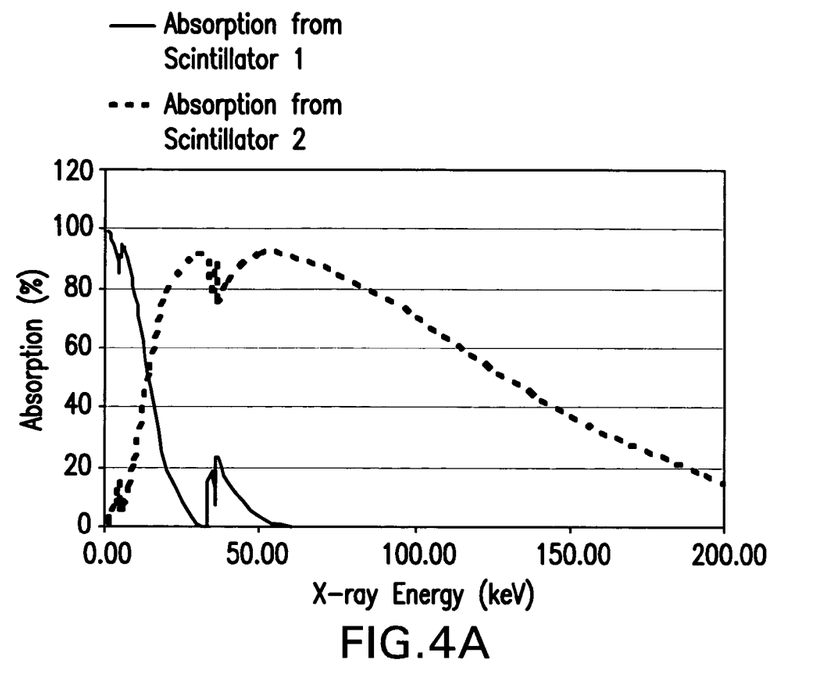
FIGS. 4A, 4B, 4C, and 4D are plots of the X-ray absorption in a CsI scintillator assuming a second scintillator with a thickness of 3000 μm and a first scintillator thickness of: a) 50 μm, b) 100 μm, c) 200 μm and d) 400 μm, respectively.
Figure 4B:
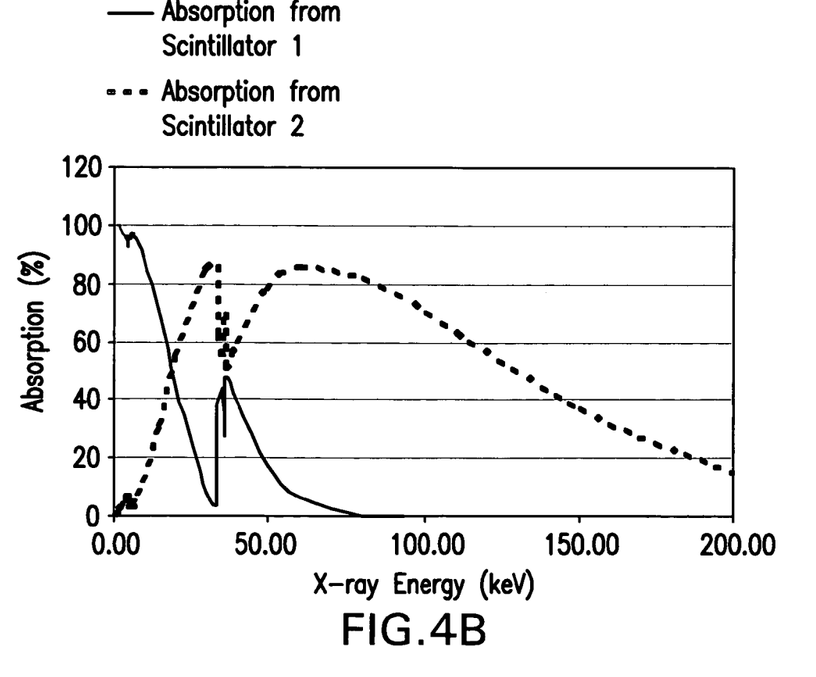
Figure 4C:
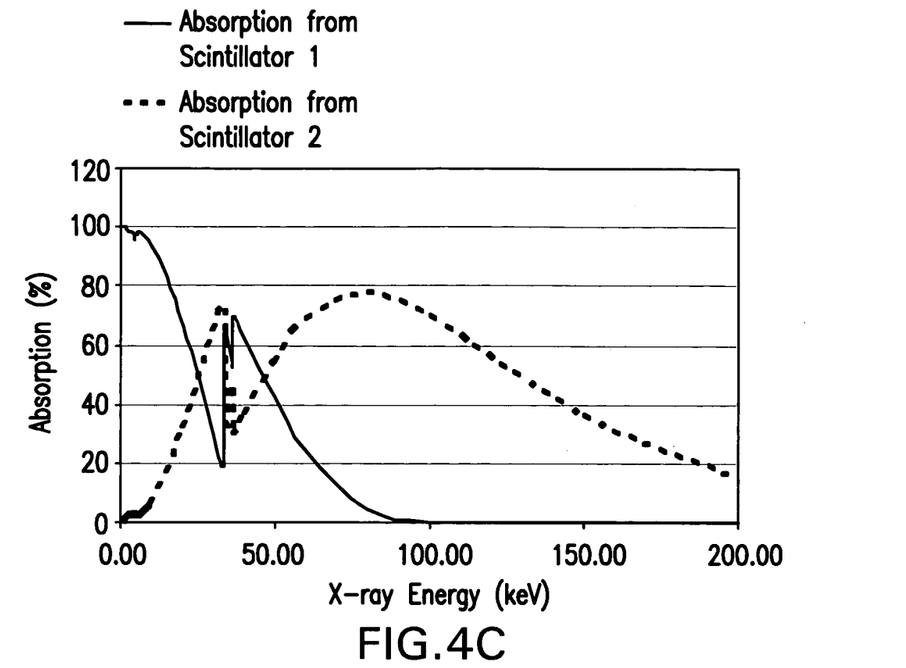
Figure 4D:
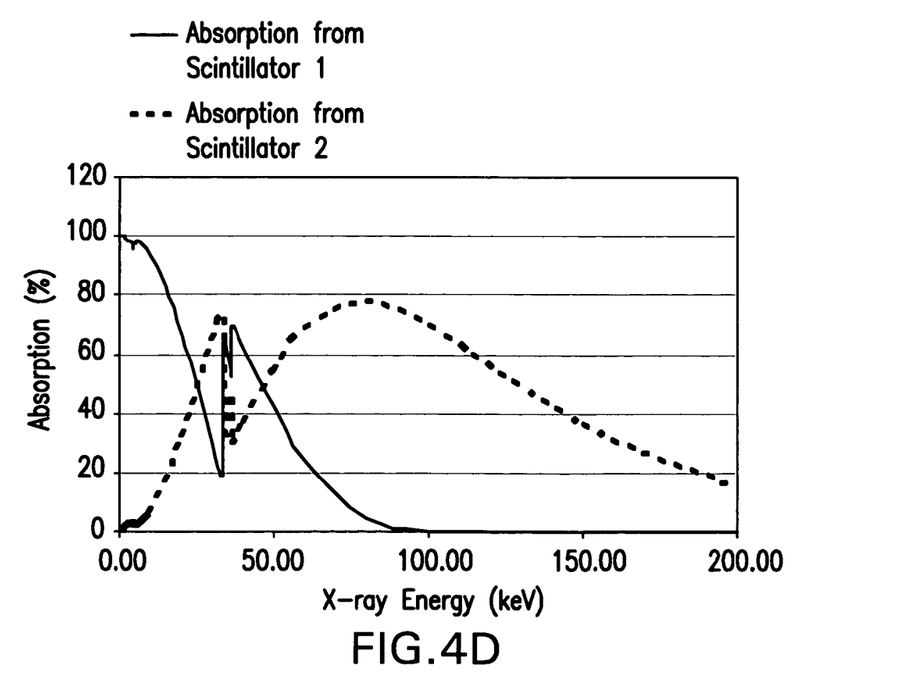

FIG. 3 is a plot of the results of the equation showing the combined objective/scintillator resolution versus the NA of the objective lens.

A fit to the curves that combines the diffraction of the objective with the defect of focus from the scintillator, is given as:

$$R = \sqrt{\left(\frac{p}{NA}\right)^2 + (qzNA)^2}$$

where z is the thickness of the scintillator, R is the combined resolution in micrometers and p and q are constants (p=0.18 and q=0.075). Note that the first term in this equation is due to diffraction, and the second term is due to the defect of focus.

This plot shows that for a given NA the defect of focus dominates the resolution when the scintillator is thick. Therefore, the optimal resolution is achieved by using a thin scintillator combined with a large NA.

With this information, the scintillators are designed based on the resolution requirements and the desire to separate the low energy band from the high energy band.

It is desirable to capture as many x-rays as possible thus requiring a thick scintillator. This is in contrast to the resolution requirement that the scintillator be thin as possible. The design criteria for the two detector systems are somewhat different, however.

The first detector system 110 should efficiently capture the lower energy x-rays and allow the higher energy x-rays to pass through to the second scintillator 122. In this case, the system resolution is not the limitation, but rather an appropriate thickness $l_{112}$ for scintillator 112 should be selected for passing the higher energy x-rays.

In the second scintillator 122, the design objective is to capture as much of the high energy x-rays as possible, thus requiring a thick scintillator. Therefore, in the second scintillator 122, the the scintillator thickness $l_{122}$ is maximized for a given resolution. Starting with the design of the second scintillator 122 the optimal scintillator thickness $l_{122}$ can be found by $$z_{opt} = \frac{R^2}{2pq}$$

and the optimal NA $$NA_{opt} = \sqrt{2}\, p\frac{1}{R}$$

The thickness $l_{122}$ of the high energy scintillator 122 is limited by the resolution since this scintillator should typically be as thick as possible. If the target resolution in this scintillator is set to 10 micrometers, targeting an overall system resolution of less than 20 micrometers, the optimal scintillator thickness and NA can be determined. In one embodiment, the optimal scintillator thickness for the high energy scintillator 122 is between 2,000 and 4,000 μm, or about 3,000 μm.

FIGS. 4A-4D illustrate a selection process for the thickness of the first scintillator 112, showing the x-ray absorption through varying thicknesses of the first scintillator 112. In all cases the second scintillator 122 is 3000 μm thick.

Figure 5:
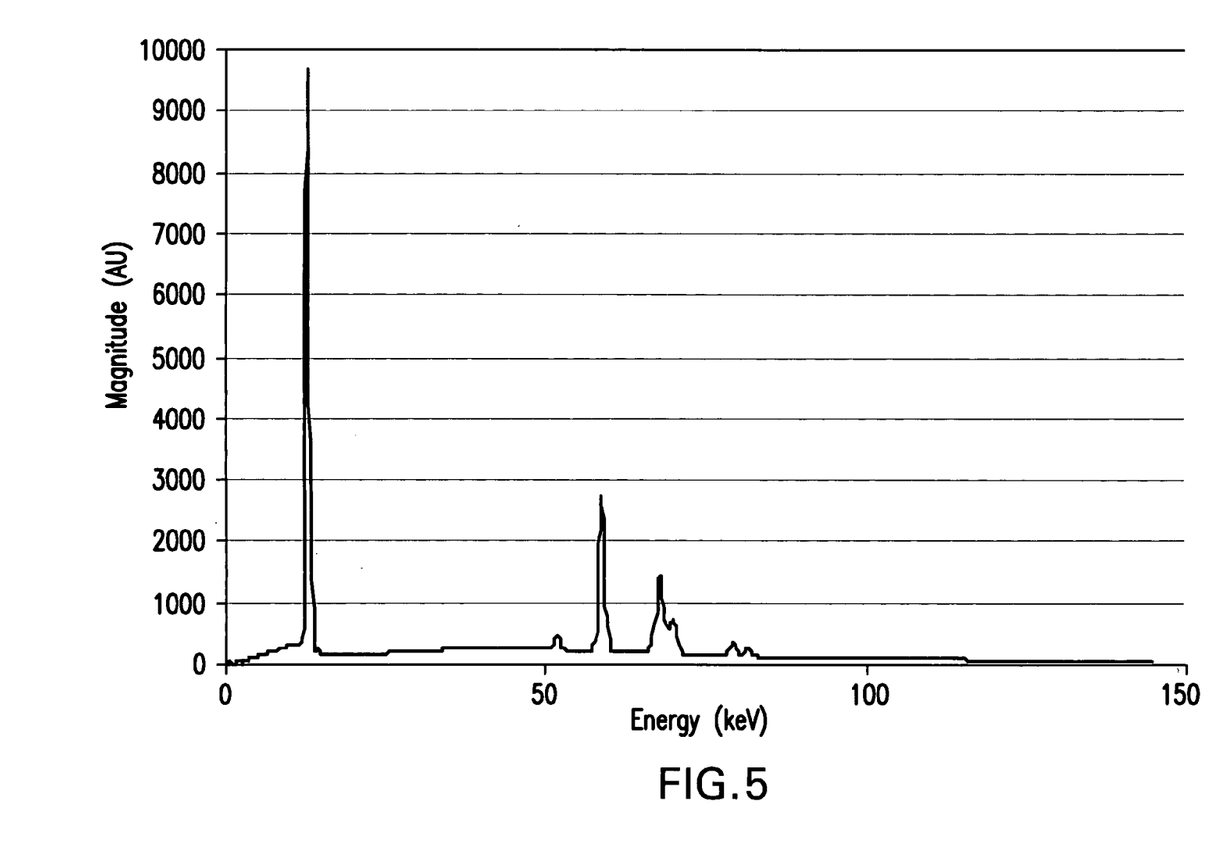
FIG. 5 shows X-ray source spectrum from a Tungsten Target with 150 keV excitation.

FIG. 5 shows the plots scaled by the incident source spectrum, here shown with a titanium target. It is desired to choose a scintillator thickness that gives the best energy separation between the two scintillators. Based on these criteria, a thickness $l_{112}$ of the first scintillator of between 100 and 300 μm or approximately 200 μm is used in the current embodiments.

Generally, a scintillator thickness of 200 μm gives good x-ray absorption up to about 30 keV for the first scintillator 112 and thus provides for good energy separation between the two detectors.

Using this thickness, a resolution of about 2.3 μm is achievable in the first detector 116. This is well within a target resolution of 20 μm.

The resulting scintillator thicknesses, NA's and resolutions for each detector are outlined in the table below.

|  | Thickness (um) | NA | Resolution (um) |
|---|---|---|---|
| Scintillator 1 (112) | 200 | 0.11 | 2.3 |
| Scintillator 2 (122) | 3000 | 0.028 | 9 |

Finally, we need to choose the appropriate resolution for sampling. The detector resolution is given by $$r_d = \frac{\delta}{M}$$

where δ is the detector pixel size and M is the magnification of the objective. To ensure proper sampling using the Nyquist sampling criterion, the detector pixel spacing must be $$\frac{\delta}{M} = 0.5 r_{total}$$

Utilizing a charge coupled device (CCD) detector with a pixel size of 6.45 micrometers and a total system resolution of 10 micrometers, we find we need a magnification of about 1.3× to satisfy the Nyquist sampling criterion.

The final term in the expression for system resolution is due to geometric blurring and is discussed below.

Figure 6:
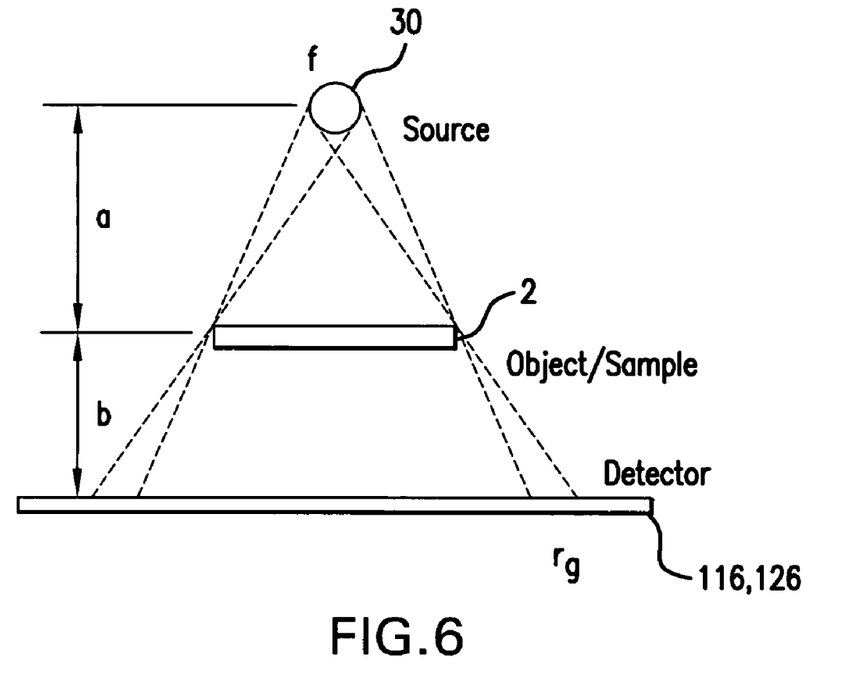
FIG. 6 is a schematic side view of a source and detector system, illustrating the problem of geometric unsharpness.

FIG. 6 illustrates the problem of geometric blurring. Specifically, the larger the spot size of the x-ray source the more the image will be blurred due to rays emitted across the face of the source spot Some of the present designs allow for the magnification in the optical stage rather than through geometric magnification in the x-ray stage, which is common to most projection based microscopes. By using a high efficiency scintillator detectors, 112, 122 and imaging this scintillator using an objective lens systems 114, 124, high resolutions are possible using commercial x-ray sources with relatively large spot sizes.

This is made possible by placing the source 30 at a sufficient distance from the sample 2 to guarantee that the geometric blurring is less than the resolution limited by objective and scintillator.

The optical detectors 116, 126 represent the active detection area of the detector assembly. In this configuration the geometric blurring is given by $$r_g = f\left(\frac{b}{a}\right)$$

where f is the source spot size in micrometers.

If we assume b to be about 25 millimeters (mm) to keep the instrument length small and to allow sufficient room to rotate the sample for tomography we can calculate the required source to object distance a required to achieve an overall system resolution of 10 μm.

$$a = f\left(\frac{b}{r_g}\right)$$

$$a = 5\left(\frac{25}{\sqrt{10^2 - 5^2}}\right)$$

$$a \approx 15\ mm$$

Thus, generally the source to object distance is greater than about 10 mm, but preferable less than 50 mm. In this example it is about 15 mm.

Figure 7:
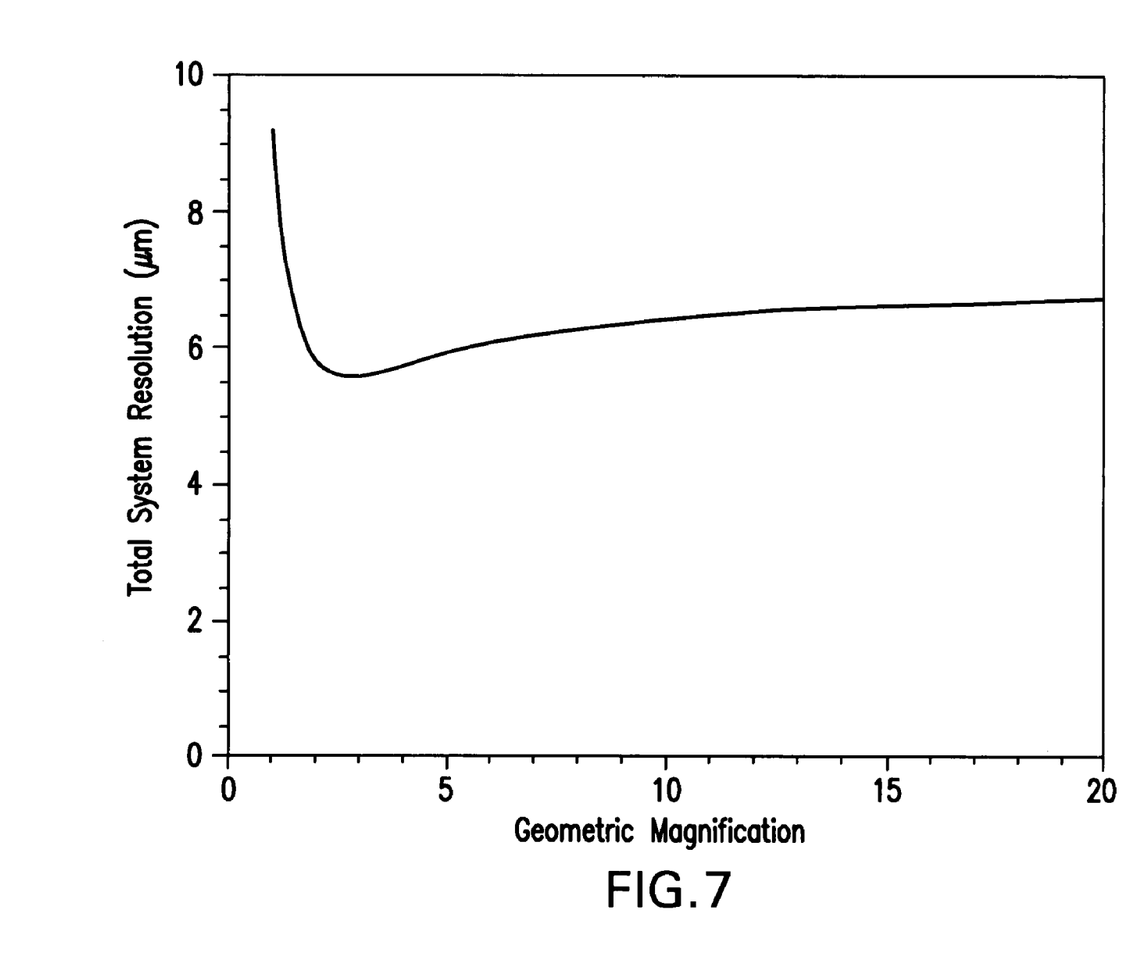
FIG. 7 is a plot showing total system resolution as a function of Geometric Magnification, using the inventive detector design.

FIG. 7 shows the total system resolution as a function of Geometric Magnification. Using the present detector 100, the system will be well below a 10 μm resolution target.

This is assuming a source spot size of 5 μm, which is typical of commercially available micro-focus x-ray sources. Therefore, the source to detector distance is less than 50 mm. This allows for a very compact overall system with a very small footprint.

In this dual-detector configuration, the first scintillator 112 is primarily used to image soft tissues, which generally have much lower contrast than the hard tissues that the second scintillator 122 is primarily responsible for detecting. Therefore, we will calculate the dosage required for the first scintillator 112 to acquire a two dimensional image and a three dimensional dataset.

As x rays pass through an object, they undergo absorption and phase shifting, as described by:

$$\phi(z) = \phi(0) e^{iknz},$$

where k is the wave number and n is the complex index of refraction defined as:

$$n = 1 - \delta - i\beta.$$

The value of δ characterizes the phase shift and β characterize the absorption. The attenuation length is $$\mu = \frac{\lambda}{4\pi\beta},$$

and the length to produce 2π phase shift is:

$$z_{2\pi} = \frac{\lambda}{1-\delta}.$$

Figure 8:
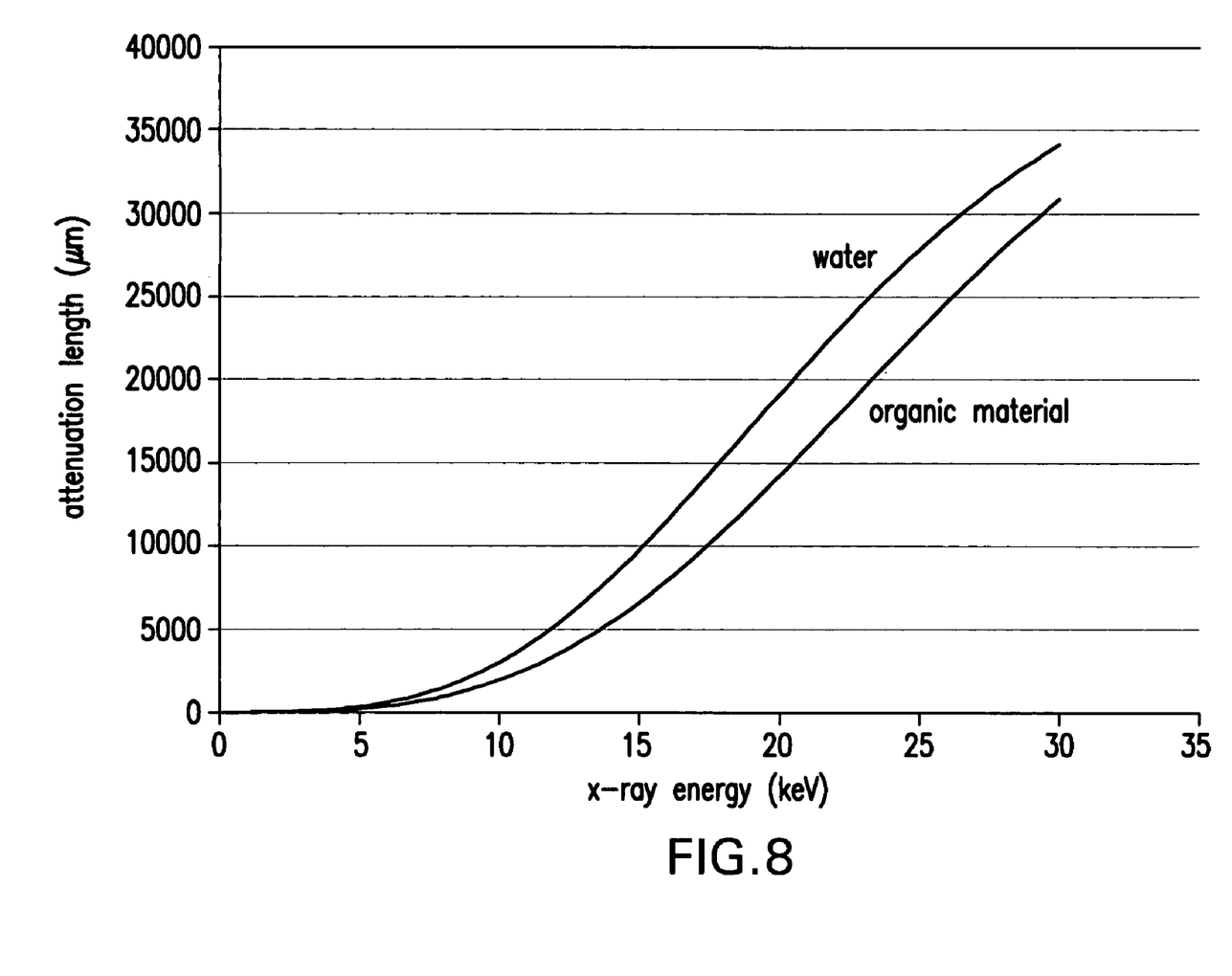
FIG. 8 is a plot of attenuation length in micrometers as a function of x-ray energy for soft tissues.

With imaging soft tissue samples with absorption contrast, the difference between the β values of water and organic material provides the image contrast. The attenuation length of water and a nominal organic material is plotted in FIG. 8. Observe from FIG. 8 that the spectrum absorbed by the scintillator 112 is concentrated between 15 and 30 keV. Within this spectrum range, the contrast is relatively constant and a nominal contrast value of about 12% can be obtained by integrating the contrast within this range.

The number of photons required to images the protein features is given by:

$$N = \frac{SNR^2}{TC^2},$$

where SNR is the signal-to-noise ratio, T is the transmission, and C is the contrast. It is generally accepted that features can be identified with a signal-to-noise level of 5:1. Assuming an animal sample with 15 mm size and a nominal 30% transmission, about 6000 photons are required for each exposure. Then each 10 µm pixel volume absorbs about 3. These photons deposit $8\times10^{-5}$ J of energy into a volume with $10^{-12}$ kg of mass. The resulting dosage is 8 mGray, or 0.8 rem. A tomographic data set with 60 projections can be acquired with less than 50 rem dosage, which will have negligible adverse effect on the subject. When imaging at 2 µm resolution, however, the dosage will increase by a factor of 1000, to about 800 rem. This level of radiation will likely kill the subject, and is therefore appropriate only for terminal studies or non-live samples.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray detector comprising:
a first detector system comprising a first scintillator for converting x-rays from a sample into a first optical signal, having a thickness of 50 to 300 micrometers, and a first optical detector for detecting the first optical signal, the first detector system further comprising: a first mirror for directing the first optical signal out of a path of the X-rays and to the first optical detector, and a first optical imaging system for imaging the first optical signal onto the first optical detector; and
a second detector system comprising a second scintillator, which is thicker than the first scintillator, for converting x-rays from the sample, which have passed through the first scintillator and the first mirror but not the first optical detector, into a second optical signal, and a second optical detector for detecting the second optical signal, the second detector system further comprising: a second mirror for directing the second optical signal out of a path of the X-rays and to the second optical detector, and a second optical imaging system for imaging the second optical signal onto the second optical detector.

2. An x-ray detector as claimed in claim 1, further comprising a controller for computing a phase map of the sample by reference to the first optical signal and the second optical signal.

3. An x-ray detector as claimed in claim 1, wherein a first thickness of the first scintillator of the first detector system is between 100 and 300 micrometers.

4. An x-ray detector as claimed in claim 1, wherein a second thickness of the second scintillator is between 2000 and 4000 micrometers.

5. An x-ray detector as claimed in claim 1, wherein a first thickness of the first scintillator of the first detector system is between 100 and 300 micrometers and a second thickness of the second scintillator is between 2000 and 4000 micrometers.

6. An x-ray imaging system comprising:
an x-ray source for generating x-rays for irradiating a sample;
a first detector system comprising a first scintillator for converting x-rays from the sample into a first optical signal, having a thickness of 50 to 300 micrometers, and a first optical detector for detecting the first optical signal, the first detector system further comprising: a first mirror for directing the first optical signal out of a path of the X-rays and to the first optical detector, and a first optical imaging system for imaging the first optical signal onto the first optical detector; and
a second detector system comprising a second scintillator, which is thicker than the first scintillator, for converting x-rays from the sample and from the first detector system, which have passed through the first scintillator and the first mirror but not the first optical detector, into a second optical signal, and a second optical detector for detecting the second optical signal, the second detector system further comprising: a second mirror for directing the second optical signal out of a path of the X-rays and to the second optical detector, and a second optical imaging system for imaging the second optical signal onto the second optical detector.

7. An x-ray imaging system as claimed in claim 6, further comprising a condenser for concentrating x-rays from the x-ray source onto the sample.

8. An x-ray imaging system as claimed in claim 6, further comprising an x-ray objective for collecting x-rays from the sample and directing the x-rays to the first detector system and the second detector system.

9. An x-ray imaging system as claimed in claim 6, further comprising a stage for rotating the sample relative to the x-rays.

10. An x-ray imaging system as claimed in claim 6, further comprising a spectral filter between the first detector system and the second detector system for improving an energy separation between the first detector system and the second detector system.

11. An x-ray imaging system as claimed in claim 6, wherein the x-ray source generates X-rays in a low energy band and a high energy band.

12. An x-ray imaging system as claimed in claim 6, wherein the x-ray source is a synchrotron.

13. An x-ray imaging system as claimed in claim 6, wherein the x-ray source is an electron bombardment x-ray source.

14. An x-ray imaging system as claimed in claim 13, wherein a target of the source is tungsten.

15. An x-ray imaging system as claimed in claim 6, wherein the first detector system and the second detector system receive substantially monochromatic X-rays.

16. An x-ray imaging system as claimed in claim 6, wherein the first scintillator is configured for approximately 50% absorption of the x-rays.

17. An x-ray imaging system as claimed in claim 6, further comprising a monochromator for generating monochromatic X-rays from the source.

18. An x-ray imaging system as claimed in claim 6, further comprising a controller for computing a phase map of the sample by reference to the first optical signal and the second optical signal.

19. An x-ray imaging system as claimed in claim 6, wherein a first thickness of the first scintillator is between 100 and 300 micrometers.

20. An x-ray imaging system as claimed in claim 6, wherein a second thickness of the second scintillator is between 2000 and 4000 micrometers.

21. An x-ray imaging system as claimed in claim 6, wherein a first thickness of the first scintillator is between 100 and 300 micrometers and a second thickness of the second scintillator is between 2000 and 4000 micrometers.

22. An x-ray imaging method comprising:
generating x-rays for irradiating a sample, the x-rays directed along an x-ray path;
converting x-rays from the sample into a first optical signal, in a first scintillator having a thickness of 50 to 300 micrometers;
reflecting the first optical signal out of the x-ray path with a mirror;
detecting the first optical signal out of the x-ray path;
converting x-rays, received through the mirror, from the sample and from the first detector system scintillator into a second optical signal, in a second scintillator which is thicker than the first scintillator;
reflecting the second optical signal out of the x-ray path; and
detecting the second optical signal out of the x-ray path.

* * * * *